United States Patent
Lu et al.

(10) Patent No.: US 8,290,103 B2
(45) Date of Patent: Oct. 16, 2012

(54) METHOD FOR TRANSMITTING PARALLELIZATION SIGNALS OF UNINTERRUPTIBLE POWER SUPPLIES

(75) Inventors: Yihang Lu, Shenzhen (CN); Dangsheng Zhou, Shenzhen (CN); Zhihua Wang, Shenzhen (CN); Quanbo Xia, Shenzhen (CN); Bo Liu, Shenzhen (CN); Steve Moran, Columbus, OH (US); Chris Crawford, Columbus, OH (US); Brian Heber, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 245 days.

(21) Appl. No.: 12/601,045

(22) PCT Filed: May 23, 2008

(86) PCT No.: PCT/CN2008/001003
§ 371 (c)(1),
(2), (4) Date: Jun. 4, 2010

(87) PCT Pub. No.: WO2008/145011
PCT Pub. Date: Dec. 4, 2008

(65) Prior Publication Data
US 2010/0239028 A1    Sep. 23, 2010

(30) Foreign Application Priority Data

May 24, 2007  (CN) .......................... 2007 1 0109288

(51) Int. Cl.
*H04L 7/00* (2006.01)
(52) U.S. Cl. ........ 375/354; 375/220; 375/257; 375/295; 375/356; 375/358; 307/65; 307/66; 700/286

(58) Field of Classification Search .................. 375/220, 375/257, 295, 354, 356, 358; 307/65, 66; 700/286
See application file for complete search history.

(56) References Cited

U.S. PATENT DOCUMENTS

| | | | |
|---|---|---|---|
| 2005/0043859 A1* | 2/2005 | Tsai et al. | 700/286 |
| 2007/0210652 A1* | 9/2007 | Tracy et al. | 307/66 |

FOREIGN PATENT DOCUMENTS

| | | |
|---|---|---|
| CN | 1423389 A | 6/2003 |
| CN | 1581633 A | 2/2005 |
| CN | 1713480 A | 12/2005 |

OTHER PUBLICATIONS

Hontao, Shan, Xikun, Chen, Yong, Kang and Ting, Lu. "A Novel & Practical Digial Parallel UPS System."*Telecommunications Energy Conference, 2006. INTELEC '06. 28th Annual International* Sep. 2006: p.1-5. Print.
International Search Report for PCT/US2008/001003.

* cited by examiner

*Primary Examiner* — Leon Flores
(74) *Attorney, Agent, or Firm* — Harness, Dickey & Pierce, P.L.C.

(57) ABSTRACT

The present invention discloses a method for transmitting parallelization signals of uninterruptible power supplies, which firstly performs a serialization process on parallelization signals by a logic processing unit and then performs synchronous transmission of the parallelization signals of respective node units over a bus. The method for serial transmission of parallelization signals of uninterruptible power supplies according to the invention can be implemented with easy wiring and can achieve a strong anti-interference ability, ensure real time signal transmission over a guaranteed transmission distance and identify conveniently the failure of a parallelization line while satisfying fundamental transmission demands.

15 Claims, 2 Drawing Sheets

METHOD FOR TRANSMITTING PARALLELIZATION SIGNALS OF UNINTERRUPTIBLE POWER SUPPLIES

FIELD OF THE INVENTION

The present invention relates to the field of uninterruptible power supplies and in particular to a method for transmitting parallelization signals of uninterruptible power supplies.

BACKGROUND OF THE INVENTION

An Uninterruptible Power Supply (UPS) is a constant-frequency, stable-voltage, pure, uninterruptible and high quality power supply. With the rapid development of information technologies and the wide applications of computers, the UPS has become an indispensable power supply device in numerous critical scenarios. Plural UPS units are often required to be parallelized to operate for improved reliability or an increased capacity. Parallelization signals are intended to enable the respective UPS units in a parallelized system to be aware of operating statuses of the others and to provide a reference for their own operations in view of these statuses. In order to ensure rapid and reliable parallelization, timely and reliable transmission of a large amount of information between the respective UPS units shall be ensured, and also a relatively long transmission distance shall be required. Therefore, the present parallelization communication generally transmits the parallelization signals in parallel. Although this transmission method has the advantages of being simple and rapid, it may be limited in terms of important aspects such as the transmission distance, tolerance, wiring, etc.

Signals were generally transmitted in parallel in prior parallelization communication methods. As illustrated in FIG. 1, a number, n, (n>1) of parallelization signals shall be transmitted for two parallelized UPS units, where an logic AND (i.e., "line-AND") operation, is performed by a diode or a similarly functioning circuit on each signal while being transmitted, so that each UPS unit can acquire status information of the others. In FIG. 1, Sig_1_Tx and Sig_n_Tx represent a parallelization signal 1 and a parallelization signal n, which are transmitted from a UPS unit, and Sig_1_Rx and Sig_n_Rx represent a parallelization signal 1 and a parallelization signal n, which are received by the UPS unit. The use of the method illustrated in FIG. 1 for parallelization communication enables rapid interaction of the signals between the respective UPS units, but the number of required signal lines will increase as the number of parallelization signals increases. A large number of parallelization signal lines may cause complication and hence inconvenience of wiring. And, hardware circuits have to be redesigned once the number of parallelization signals increases, which may result in inflexibility. Moreover, the parallelization transmission process may be susceptible to interference and fail to satisfy the required long-distant transmission. More importantly, once one signal line is shorted with another or with a supply/ground, the system can not identify the short circuit due to the limitation of circuits.

SUMMARY OF THE INVENTION

An object of the invention is to provide a method for transmitting parallelization signals of uninterruptible power supplies in view of the foregoing problems in the prior art to address the problems in the prior art of inconvenient wiring, susceptibility to interference, a short transmission distance and the inability to identify reliably the failure of a parallelized line.

In order to attain the above object of the invention, a technical solution adopted according to the invention lies in a method for transmitting parallelization signals of uninterruptible power supplies, which includes firstly performing a serialization process on parallelization signals by a logic processing unit and then performing synchronous transmission of the parallelization signals with the same nature of respective node units over a bus.

Furthermore, the logic processing unit is a CPLD or an FPGA or a microcontroller.

Furthermore, the node units include a master node unit and a slave node unit, which may be distinguished through power-up competition or hardware configuration.

Still furthermore, the master node unit transmits synchronization information at a specific timing, and the slave node unit receives the synchronization information in real time; and after the master node unit transmits the synchronization information and the slave node unit receives the correct synchronization information, the synchronization succeeds, and then the respective node units transmit the parallelization signals in series in the same sequence of bits.

Even furthermore, the synchronization information is a series of symbols different from valid data.

Still furthermore, the transmission over the bus is implemented by a "line-AND" circuit unit.

Even furthermore, the "line-AND" circuit unit is a CAN transceiver.

Still furthermore, the transmission over the bus is implemented by a "line-OR" circuit unit.

Even furthermore, the "line-OR" circuit unit is a CAN transceiver.

The method for serial transmission of parallelization signals of uninterruptible power supplies according to the technical solution of the invention can be implemented with easy wiring and can achieve a strong anti-interference ability, ensure real time signal transmission over a guaranteed transmission distance and identify conveniently the failure of a parallelization line while satisfying fundamental transmission demands.

With the CPLD or the FPGA or the microcontroller, parallel signals can be converted conveniently into serial signals in an ensured real time mode; and such selection of the logic controller for use can also achieve synchronization of valid signals transmitted from the plural parallelized units and therefore will be more efficient and economic than the use of a discrete logic device to achieve the function.

In terms of signal synchronization, no additional synchronization line will be adopted for signal synchronization in view of its cost, but a series of special symbols can be used as synchronization information. This series of special symbols shares the bus with valid data, but its code stream is not the same as that of the valid data, which can ensure that the respective nodes can extract the synchronization information from a continuous data stream, so that the respective nodes can transmit the valid data with the same nature onto the bus at the same time and receive valid information over the bus. The synchronization information will be transmitted from the master node and just received by the slave node. The distinguishing between master and slave nodes can effectively plan a synchronization mechanism and reduce an overhead of competition for the bus. Whether a node is a master or slave node can be derived through hardware configuration or power-up competition.

On the parallelization principle, status information of the respective nodes shall be integrated in real time. If status information of one node can be transmitted only over the bus in a cycle T, then it will take a number, N*T, of cycles to finish information integration once for a system consisting of a number, N (N>=2), of parallelized units. If a "line-AND" or "line-OR" circuit unit is adopted, however, all the nodes can transmit their own status information in a cycle T, and ultimate integrated information can be acquired in the same cycle with the "line-AND" or "line-OR" circuit unit. This can save greatly a time overhead and improve the real time nature of the parallelized system. Moreover, the CAN transceiver can convert the parallelization signals into differential signals, and differential transmission of the signals can improve significantly the transmission distance and the line anti-interference ability. Naturally, the design for a parallelization system over a short transmission distance under a good operating circumstance can adopt a normal "line-AND" or "line-OR" circuit unit instead of the CAN transceiver to thereby reduce the cost of devices.

DETAILED DESCRIPTION OF THE INVENTION

The First Embodiment

An implementation of a method according to the invention will be detailed below with reference to the drawings.

For the demand of paralleling UPS units, serial transmission of parallel discrete signals shall satisfy the following conditions:

1. Real time parallelization communication shall be satisfied to ensure normal operation of a parallelized system;

2. An appropriate transmission specification shall be required for extraction of valid information from a data stream;

3. An implemented bus shall be logic "line-OR"- or "line-AND"-enabled and, in the present embodiment, be "line-AND"-enabled as an example; and 4. The constituted bus shall be provided with a good ability to determine a failure so as to ensure convenience and error tolerance of networking.

In view of these requirements, the present embodiment adopts a Complex Programmable Logic Device (CPLD) and a Controller Area Network (CAN) transceiver to implement a method for high-speed transmission of serial signals over a bus.

Figure 1:
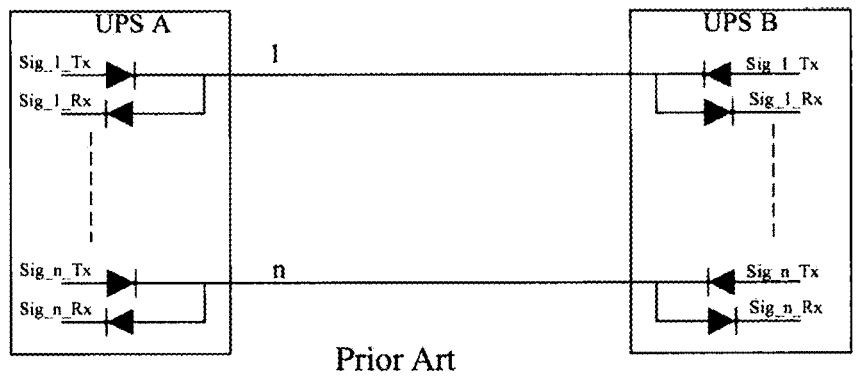
FIG. 1 is a schematic diagram illustrating the principle of parallel transmission of parallelization signals in the prior art.
Figure 2:
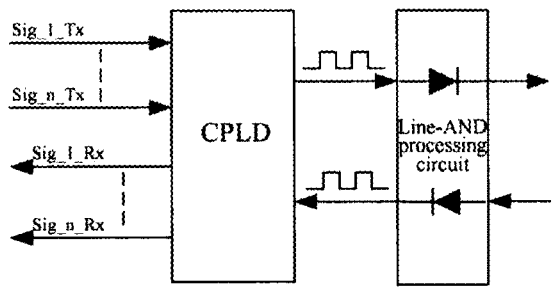
FIG. 2 is a schematic diagram illustrating serialization of parallelization signals according to an embodiment of the invention.
Figure 3:
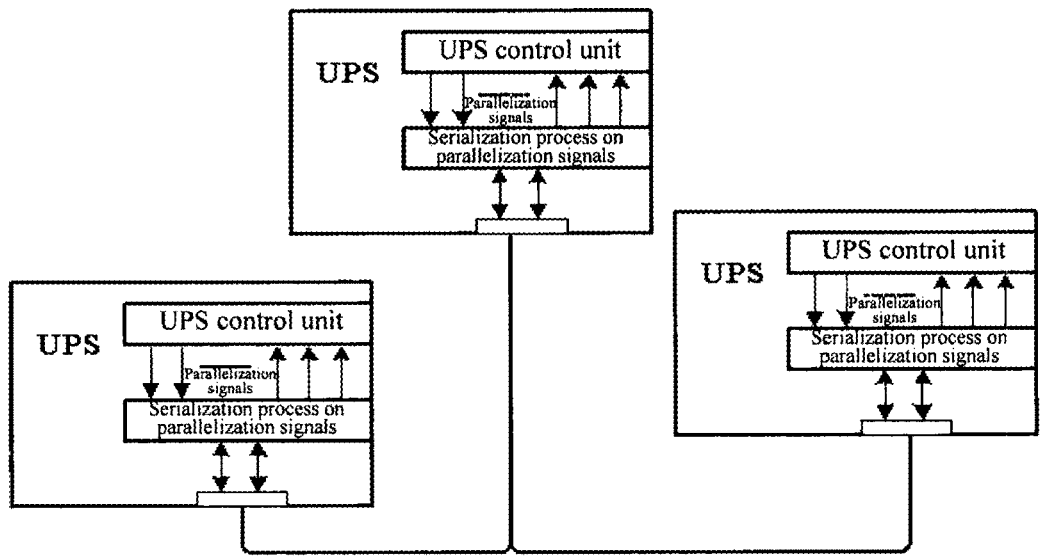
FIG. 3 is a schematic block diagram illustrating serial transmission of parallelization signals according to an embodiment of the invention.

As illustrated in FIG. 2 showing a technical solution adopted according to the present embodiment, parallelization signals of each UPS unit in a parallelized system are converted into serial signals and then transmitted over a bus. FIG. 3 illustrates a block diagram of line connections in the parallelized system after the foregoing processing.

As can be seen from FIG. 3, a number, n, of signal lines which otherwise would have been required can be converted into one or two (for differential transmission) signal lines in the foregoing solution to thereby reduce greatly the number of transmission lines.

The four conditions mentioned above shall be ensured to be satisfied with the use of the foregoing method for serial transmission of parallelization signals.

For real time transmission, serial transmission may have a larger time overhead than that of parallel transmission, but serial transmission can satisfy perfectly the real time requirement of the parallelized system by reasonably deploying a protocol and selecting a transmission speed to enable interaction of all parallelized signals in a specified period of time.

Figure 4:
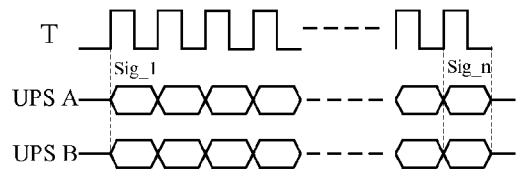
FIG. 4 is a schematic diagram illustrating synchronous transmission of signals according to an embodiment of the invention.

As illustrated in FIG. 4, extraction of valid information means that both a UPS unit A and a UPS unit B transmit Sig_1 or Sig_n in the same clock cycle, so that the UPS unit A and the UPS unit B shall be synchronized in clock to achieve the foregoing objective. To this end, an embodiment of the invention firstly utilizes the CPLD for the respective UPS units to compete for a master, so that the UPS unit authorized as a master will transmit as synchronization information a series of symbols different from parallelization signal data, and the UPS unit authorized as a slave will receive the synchronization information transmitted from the master. If the master UPS unit transmits the synchronization information and the slave UPS unit receives the correct synchronization information, then it indicates a success of synchronization, and the respective UPS units will transmit the parallelization data in series in the same sequence (Sig_1, Sig_2, . . . Sig_n).

Figure 5:
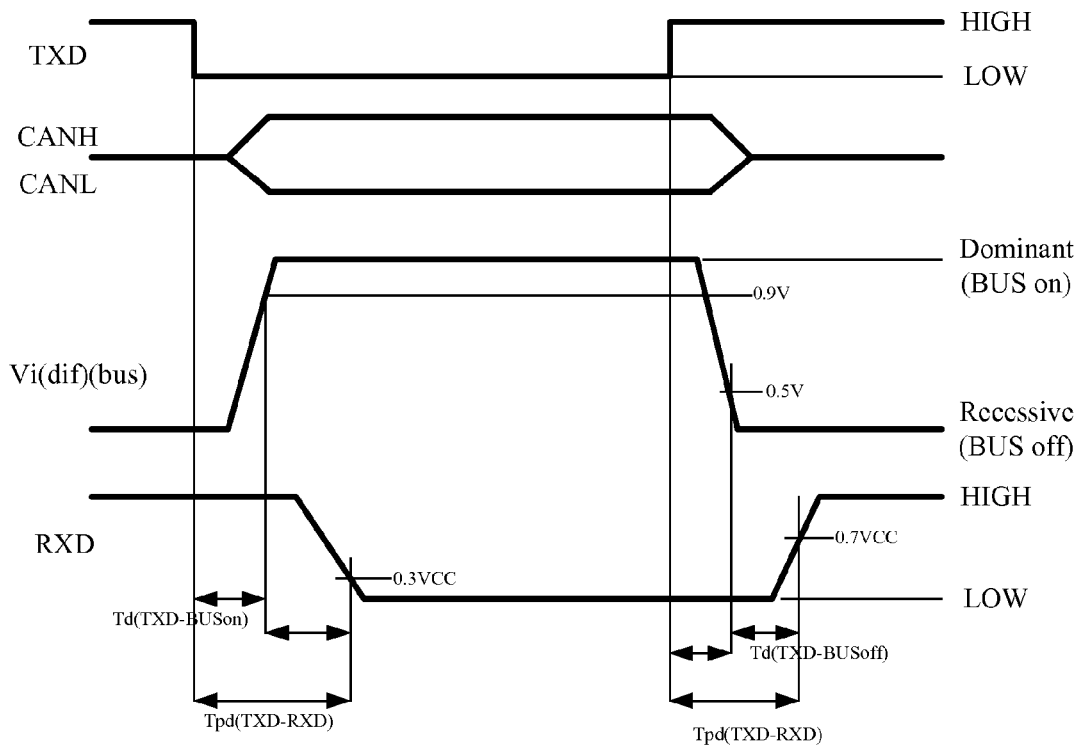
FIG. 5 is a schematic diagram illustrating levels of a CAN physical bus according to an embodiment of the invention.

Transmission function of the logic "line-OR"- or "line-AND"-enabled bus can be implemented by the CAN transceiver. For a general CAN bus, signals are transmitted physically in a differential mode, and a typical timing diagram thereof is as illustrated in FIG. 5, where a bus voltage difference above 0.9V represents a logic zero level (an explicit level) of a communication signal, and a bus voltage difference below 0.5V represents a logic high level (an implicit level) of a communication signal. The CAN transceiver is an interface between a CAN protocol controller and a physical bus. When an output of the transmission end TXD of the transceiver is at a high level, if an output of the transmission end TXD of another node over the bus is at a low level, then the bus will present a logic low level, that is, the implicit characteristic of the node over the bus will be covered by the explicit characteristic of the other node. In other words, the CAN transceiver is "line-AND"-enabled from the viewpoint of logic.

During communication over a general CAN bus, each CAN node over the bus will utilize the explicit characteristic of the bus to avoid a confliction. When a CAN node transmits at an implicit level, if the CAN controller detects presence of an explicit level over the bus, then it will stop its own transmission behavior to avoid confusion of data over the bus. On the contrary in the present embodiment, since only the CAN transceiver but no CAN controller exists in the circuit, the respective nodes can transmit their own parallelization information concurrently without stopping any node from transmission due to a confliction. Meanwhile, the "line-AND" capability of the CAN transceiver can be utilized to perform a real time logic line-AND operation of the respective parallelization signals over the bus to thereby achieve the purpose of real time integration of the parallelization signals of the respective UPS units.

As can be known from the foregoing analysis, after the parallelization signals are converted from parallel transmission into serial transmission, what are transmitted over a real parallelization line are pulse signals which vary between high and low levels, so that once the CPLD detects that the received data is at a continuously constant level, presence of a failure over the parallelization line can be determined. And, both the transmission distance over and the anti-interference performance of the line will be much better than those of parallel transmission due to transmission of differential signals over the parallelization line with use of the CAN transceiver.

In summary, the transmission method according to the invention can ensure real time signal transmission over a guaranteed transmission distance and identify conveniently the failure of a parallelization line while satisfying fundamental transmission demands of parallelization signals.

The Second Embodiment

For the demand of paralleling UPS units, serial transmission of parallel discrete signals shall satisfy the following conditions:

1. Real time parallelization communication shall be satisfied to ensure normal operation of a parallelized system;

2. An appropriate transmission specification shall be required for extraction of valid information from a data stream;

3. An implemented bus shall be logic "line-OR"- or "line-AND"-enabled and, in the present embodiment, be "line-AND"-enabled as an example; and 4. The constituted bus shall be provided with a good ability to determine a failure so as to ensure convenience and error tolerance of networking.

The present embodiment adopts a Field Programmable Gate Array (FPGA) and a Controller Area Network (CAN) transceiver to implement a method for high-speed transmission of serial signals over a bus. An implementation of the method will be detailed below.

As illustrated in FIG. 2 showing a technical solution adopted according to the present embodiment, parallelization signals of each UPS unit in a parallelized system are converted into serial signals and then transmitted over a bus. FIG. 3 illustrates a block diagram of line connections in the parallelized system after the foregoing processing.

As can be seen from FIG. 3, a number, n, of signal lines which otherwise would have been required can be converted into one or two (for differential transmission) signal lines in the foregoing solution to thereby reduce greatly the number of transmission lines.

The four conditions mentioned above shall be ensured to be satisfied with the use of the foregoing method for serial transmission of parallelization signals.

For real time transmission, serial transmission may have a larger time overhead than that of parallel transmission, but serial transmission can satisfy perfectly the real time requirement of the parallelized system by reasonably deploying a protocol and selecting a transmission speed to enable interaction of all parallelized signals in a specified period of time.

As illustrated in FIG. 4, extraction of valid information means that both a UPS unit A and a UPS unit B transmit Sig_1 or Sig_n in the same clock cycle, so that the UPS unit A and the UPS unit B shall be synchronized in clock to achieve the foregoing objective. To this end, an embodiment of the invention firstly utilizes the FPGA for the respective UPS units to compete for a master or slave, so that the UPS unit authorized as a master will transmit as synchronization information a series of symbols different from parallelization signal data, and the UPS unit authorized as a slave will receive the synchronization information transmitted from the master. If the master UPS unit transmits the synchronization information and the slave UPS unit receives the correct synchronization information, then it indicates a success of synchronization, and the respective UPS units will transmit the parallelization data in series in the same sequence (Sig_1, Sig_2, . . . Sig_n).

Transmission function of the logic "line-OR"- or "line-AND"-enabled bus can be implemented by the CAN transceiver. For a general CAN bus, signals are transmitted physically in a differential mode, and a typical timing diagram thereof is as illustrated in FIG. 5, where a bus voltage difference above 0.9V represents a logic zero level (an explicit level) of a communication signal, and a bus voltage difference below 0.5V represents a logic high level (an implicit level) of a communication signal. The CAN transceiver is an interface between a CAN protocol controller and a physical bus. When its own TXD input is at a high level, if an output of the transmission end TXD of another node over the bus is at a low level, then the bus will present a logic low level, that is, its own implicit characteristic over the bus will be covered by the explicit characteristic of the other node. In other words, the CAN transceiver is "line-AND"-enabled from the viewpoint of logic.

During communication over a general CAN bus, each CAN node over the bus will utilize the explicit characteristic of the bus to avoid a confliction. In other words, when a CAN node itself transmits at an implicit level, if the CAN controller detects presence of an explicit level over the bus, then it will stop its own transmission behavior to avoid confusion of data over the bus. On the contrary in the present embodiment, since only the CAN transceiver but no CAN controller exists in the circuit, the respective nodes can transmit their own parallelization information concurrently without stopping any node from transmission due to a confliction. Meanwhile, the "line-AND" capability of the CAN transceiver can be utilized to perform a real time logic line-AND operation of the respective parallelization signals over the bus to thereby achieve the purpose of real time integration of the parallelization signals of the respective UPS units.

As can be known from the foregoing analysis, after the parallelization signals are converted from parallel transmission into serial transmission, what are transmitted over a real parallelization line are pulse signals which vary between high and low levels, so that once the FPGA detects that the received data is at a continuously constant level, presence of a failure over the parallelization line can be determined. And, both the transmission distance over and the anti-interference performance of the parallelization line will be much better than those of parallel transmission due to transmission of differential signals over the line with use of the CAN transceiver.

In summary, the transmission method according to the invention can ensure real time signal transmission over a guaranteed transmission distance and identify conveniently the failure of a parallelization line while satisfying fundamental transmission demands of parallelization signals.

Alternatively, the CPLD or the FPGA can be replaced with a microcontroller or an IC with a logic processing capability. Also alternatively, the CAN transceiver can be replaced with another "line-OR"- or "line-AND"-enabled circuit or IC.

The foregoing descriptions are further explanations made of the invention in connection with the preferred embodiments but shall not be taken as limiting the scope of the invention thereto. Numerous modifications and variations which can be made by those ordinarily skilled in the art without departing from the spirit of the invention shall be considered as falling into the scope of the invention.

The invention claimed is:

1. A method for transmitting parallelization signals of uninterruptible power supplies, comprising firstly performing a serialization process on the parallelization signals by a logic processing unit and then performing synchronous transmission of the parallelization signals of respective node units over a bus the node units comprising a master node unit and a slave node unit;

wherein the master node unit transmits synchronization information at a specific timing, and the slave node unit receives the synchronization information in real time; and after the master node unit transmits the synchronization information and the slave node unit receives the correct synchronization information, the synchronization succeeds, and then the respective node units transmit the parallelization signals in series in the same sequence of bits.

2. The method for transmitting parallelization signals of uninterruptible power supplies according to claim 1, wherein the logic processing unit is a CPLD or an FPGA or a microcontroller.

3. The method for transmitting parallelization signals of uninterruptible power supplies according to claim 2, wherein the transmission over the bus is implemented by a "line-AND" circuit unit.

4. The method for transmitting parallelization signals of uninterruptible power supplies according to claim 2, wherein the transmission over the bus is implemented by a "line-OR" circuit unit.

5. The method for transmitting parallelization signals of uninterruptible power supplies according to claim 1, wherein the master node unit is derived through power-up competition or hardware configuration.

6. The method for transmitting parallelization signals of uninterruptible power supplies according to claim 5, wherein the transmission over the bus is implemented by a "line-AND" circuit unit.

7. The method for transmitting parallelization signals of uninterruptible power supplies according to claim 5, wherein the transmission over the bus is implemented by a "line-OR" circuit unit.

8. The method for transmitting parallelization signals of uninterruptible power supplies according to claim 1, wherein the synchronization information is a series of symbols different from valid data.

9. The method for transmitting parallelization signals of uninterruptible power supplies according to claim 8, wherein the transmission over the bus is implemented by a "line-AND" circuit unit.

10. The method for transmitting parallelization signals of uninterruptible power supplies according to claim 8, wherein the transmission over the bus is implemented by a "line-OR" circuit unit.

11. The method for transmitting parallelization signals of uninterruptible power supplies according to claim 1, wherein the transmission over the bus is implemented by a "line-AND" circuit unit.

12. The method for transmitting parallelization signals of uninterruptible power supplies according to claim 11, wherein the "line-AND" circuit unit is a CAN transceiver.

13. The method for transmitting parallelization signals of uninterruptible power supplies according to claim 1, wherein the transmission over the bus is implemented by a "line-OR" circuit unit.

14. The method for transmitting parallelization signals of uninterruptible power supplies according to claim 13, wherein the "line-OR" circuit unit is a CAN transceiver.

15. The method for transmitting parallelization signals of uninterruptible power supplies according to claim 1, wherein the respective nodes can transmit their own parallelization information concurrently.

* * * * *